United States Patent
Zhang et al.

(10) Patent No.: US 11,716,808 B2
(45) Date of Patent: Aug. 1, 2023

(54) TAMPER-RESPONDENT ASSEMBLIES WITH POROUS HEAT TRANSFER ELEMENT(S)

(71) Applicant: INTERNATIONAL BUSINESS MACHINES CORPORATION, Armonk, NY (US)

(72) Inventors: Hongqing Zhang, Hopewell Junction, NY (US); Arthur J. Higby, Cottekill, NY (US); David J. Lewison, LaGrangeville, NY (US); Philipp K. Buchling Rego, Wappingers Falls, NY (US); Jay A. Bunt, Esopus, NY (US); James Busby, New Paltz, NY (US); Levi Campbell, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 385 days.

(21) Appl. No.: 17/117,267

(22) Filed: Dec. 10, 2020

(65) Prior Publication Data
US 2022/0192011 A1 Jun. 16, 2022

(51) Int. Cl.
*G08B 21/00* (2006.01)
*H05K 1/02* (2006.01)
(Continued)

(52) U.S. Cl.
CPC ......... *H05K 1/0275* (2013.01); *F28F 13/003* (2013.01); *G08B 21/18* (2013.01);
(Continued)

(58) Field of Classification Search
CPC ............. H05K 1/0275; H05K 7/20445; H05K 7/20409; H05K 2201/09263;
(Continued)

(56) References Cited

U.S. PATENT DOCUMENTS

| 4,853,690 A | 8/1989 | Mayer et al. |
| 6,080,219 A | 6/2000 | Jha et al. |

(Continued)

FOREIGN PATENT DOCUMENTS

| CN | 208278680 U | 12/2018 |
| CN | 111017380 A | 4/2020 |

(Continued)

OTHER PUBLICATIONS

Zhang et al., "Tamper-Respondent Assembly with Structural Material Within Sealed Inner Compartment", U.S. Appl. No. 17/117,277, filed Dec. 10, 2020 (40 pages).
(Continued)

*Primary Examiner* — Tai T Nguyen
(74) *Attorney, Agent, or Firm* — Tihon Poltavets, Esq.; Kevin P. Radigan, Esq.; Heslin Rothenberg Farley & Mesiti P.C.

(57) ABSTRACT

Tamper-respondent assemblies are provided which include a circuit board, an enclosure assembly mounted to the circuit board, and a pressure sensor. The circuit board includes an electronic component, and the enclosure assembly is mounted to the circuit board to enclose the electronic component within a secure volume. The enclosure assembly includes a thermally conductive enclosure with a sealed inner compartment, and a porous heat transfer element within the sealed inner compartment. The porous heat transfer element is sized and located to facilitate conducting heat from the electronic component across the sealed inner compartment of the thermally conductive enclosure. The pressure sensor senses pressure within the sealed inner compartment of the thermally conductive enclosure to facilitate identifying a pressure change indicative of a tamper event.

18 Claims, 11 Drawing Sheets

(51) Int. Cl.
  *F28F 13/00* (2006.01)
  *G08B 21/18* (2006.01)
  *H05K 7/20* (2006.01)

(52) U.S. Cl.
  CPC ..... *H05K 7/20445* (2013.01); *H05K 7/20409* (2013.01); *H05K 2201/09263* (2013.01); *H05K 2201/09672* (2013.01); *H05K 2201/10151* (2013.01)

(58) Field of Classification Search
  CPC .......... H05K 2201/09672; H05K 2201/10151; H05K 2201/0338; H05K 2201/0341; F28F 13/003; G08B 21/18
  USPC ........................................................ 340/635
  See application file for complete search history.

(56) References Cited

U.S. PATENT DOCUMENTS

| | | | |
|---|---|---|---|
| 6,396,400 | B1 | 5/2002 | Epstein et al. |
| 7,659,816 | B2 | 2/2010 | Wandel |
| 7,787,256 | B2 | 8/2010 | Chan et al. |
| 7,954,697 | B2 | 6/2011 | Deng |
| 8,325,486 | B2 | 12/2012 | Arshad et al. |
| 9,071,446 | B2 | 6/2015 | Kreft |
| 9,904,811 | B2 | 2/2018 | Campbell et al. |
| 2010/0031368 | A1 | 2/2010 | Park et al. |
| 2015/0261267 | A1* | 9/2015 | Vadakkanmaruveedu .................. C09K 5/14 521/143 |
| 2016/0262253 | A1* | 9/2016 | Isaacs ..................... H05K 3/30 |
| 2017/0171999 | A1 | 6/2017 | Fisher et al. |
| 2017/0316228 | A1 | 11/2017 | Campbell et al. |
| 2018/0090009 | A1 | 3/2018 | Horst et al. |
| 2018/0323130 | A1 | 11/2018 | Liu et al. |
| 2019/0313526 | A1 | 10/2019 | Busby et al. |
| 2020/0098666 | A1 | 3/2020 | Wan et al. |

FOREIGN PATENT DOCUMENTS

| | | |
|---|---|---|
| CN | 111537568 A | 8/2020 |
| EP | 3 300 047 A1 | 3/2018 |
| EP | 2 018 533 B1 | 10/2018 |
| EP | 3 224 825 B1 | 12/2018 |
| EP | 3 444 736 A1 | 2/2019 |
| JP | 5676100 B2 | 2/2015 |
| KR | 10-0626619 B1 | 9/2006 |
| KR | 10-0879582 B1 | 1/2009 |
| KR | 10-20120013763 A | 2/2012 |
| KR | 10-20130110389 A | 10/2013 |
| WO | WO 2016/083917 A1 | 6/2016 |

OTHER PUBLICATIONS

Zhang et al., "List of IBM Patents and/or Patent Applications Treated as Related", U.S. Appl. No. 17/117,267, filed Dec. 10, 2020, dated Dec. 10, 2020 (2 pages).

"International Search Report (ISR) and Written Opinion" for PCT Application No. PCT/EP2021/083542, dated Mar. 17, 2022 (10 pages) (Year: 2021).

* cited by examiner

TAMPER-RESPONDENT ASSEMBLIES WITH POROUS HEAT TRANSFER ELEMENT(S)

BACKGROUND

Many activities require secure electronic communications. To facilitate secure electronic communications, an encryption/decryption system can be implemented on an electronic assembly or circuit board assembly that is included in equipment connected to a communications network. Such an electronic assembly is an enticing target for malefactors since it may contain codes or keys to decrypt intercepted messages, or to encode fraudulent messages. To prevent this, the electronic assembly can be mounted in an enclosure, which is then wrapped in a security sensor and encapsulated with polyurethane resin. The security sensor can be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal can be conveyed to a monitor circuit in order to reveal an attack on the integrity of the assembly, triggering an erasure of encryption/decryption keys stored within the electronic assembly.

SUMMARY

Provided herein, in one or more aspects, is a tamper-protected assembly, which includes a circuit board, an enclosure assembly mounted to the circuit board, and a pressure sensor. The circuit board includes an electronic component, and the enclosure assembly is mounted to the circuit board to enclose the electronic component within a secure volume. The enclosure assembly includes a thermally conductive enclosure and a porous heat transfer element. The thermally conductive enclosure includes a sealed inner compartment within the thermally conductive enclosure, and the thermally conductive enclosure is mounted to the circuit board. The porous heat transfer element is within the sealed inner compartment of the thermally conductive enclosure, and the porous heat transfer element is sized and located to facilitate conducting heat from the electronic component across the sealed inner compartment of the thermally conductive enclosure. The pressure sensor senses pressure within the sealed inner compartment of the thermally conductive enclosure to facilitate identifying a pressure change indicative of a tamper event.

In another aspect, a tamper-respondent assembly is provided which includes a circuit board, multiple electronic components, a first enclosure assembly, a second enclosure assembly, and a pressure sensor. The circuit board includes a first side and a second side, with the first side and second sides being opposite sides of the circuit board. The multiple electronic components includes at least one first electronic component coupled to the first side of the circuit board, and at least one second electronic component coupled to the second side of the circuit board. The first enclosure assembly is mounted to the first side of the circuit board to enclose the at least one first electronic component coupled to the first side of the circuit board within a first chamber of a secure volume. The first enclosure assembly includes a thermally conductive enclosure and a porous heat transfer element. The thermally conductive enclosure has a sealed inner compartment within the thermally conductive enclosure, and the thermally conductive enclosure is mounted to the first side of the circuit board. The porous heat transfer element is within the sealed inner compartment of the thermally conductive enclosure, and is sized and located to facilitate conducting heat from the at least one first electronic component across the sealed inner compartment of the thermally conductive enclosure. The second enclosure assembly is mounted to the second side of the circuit board to enclose the at least one second electronic compartment coupled to the second side of the circuit board within a second chamber of the secure volume. The pressure sensor senses pressure within the sealed inner compartment of the thermally conductive enclosure of the first enclosure assembly to facilitate identifying a pressure change indicative of a tamper event.

In a further aspect, a method of fabricating a tamper-respondent assembly is provided. The method includes providing a circuit board with an electronic component, and mounting an enclosure assembly to the circuit board to enclose the electronic component within a secure volume. The enclosure assembly includes a thermally conductive enclosure and a porous heat transfer element. The thermally conductive enclosure includes a sealed inner compartment within the thermally conductive enclosure, and the thermally conductive enclosure is mounted to the circuit board. The porous heat transfer element is within the sealed inner compartment of the thermally conductive enclosure, and is sized and located to facilitate conducting heat from the electronic component across the sealed inner compartment of the thermally conductive enclosure. The method further includes providing a pressure sensor to sense pressure within the sealed inner compartment of the thermally conductive enclosure to facilitate identifying a pressure change indicative a tamper event.

Additional features and advantages are realized through the techniques described herein. Other embodiments and aspects of the invention are described in detail herein and are considered a part of the claimed aspects.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application, for instance, of a tamper-respondent assembly.

Figure 1A:
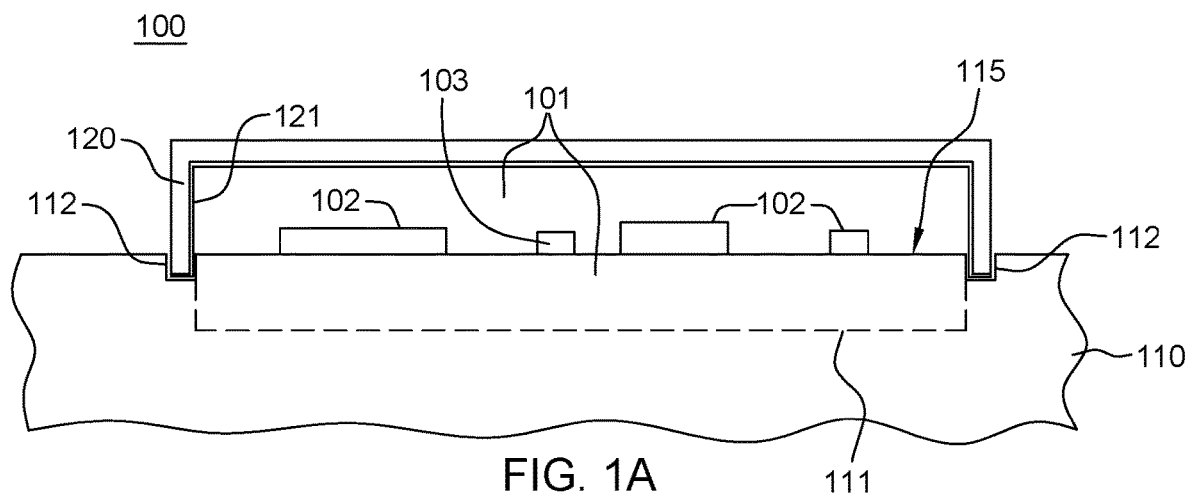
FIG. 1A is a cross-sectional elevational view of one embodiment of a tamper-proof electronic package, or tamper-respondent assembly, which includes (in part) an enclosure and a multilayer circuit board with an embedded tamper-detect circuit, in accordance with one or more aspects of the present invention.
Figure 1B:
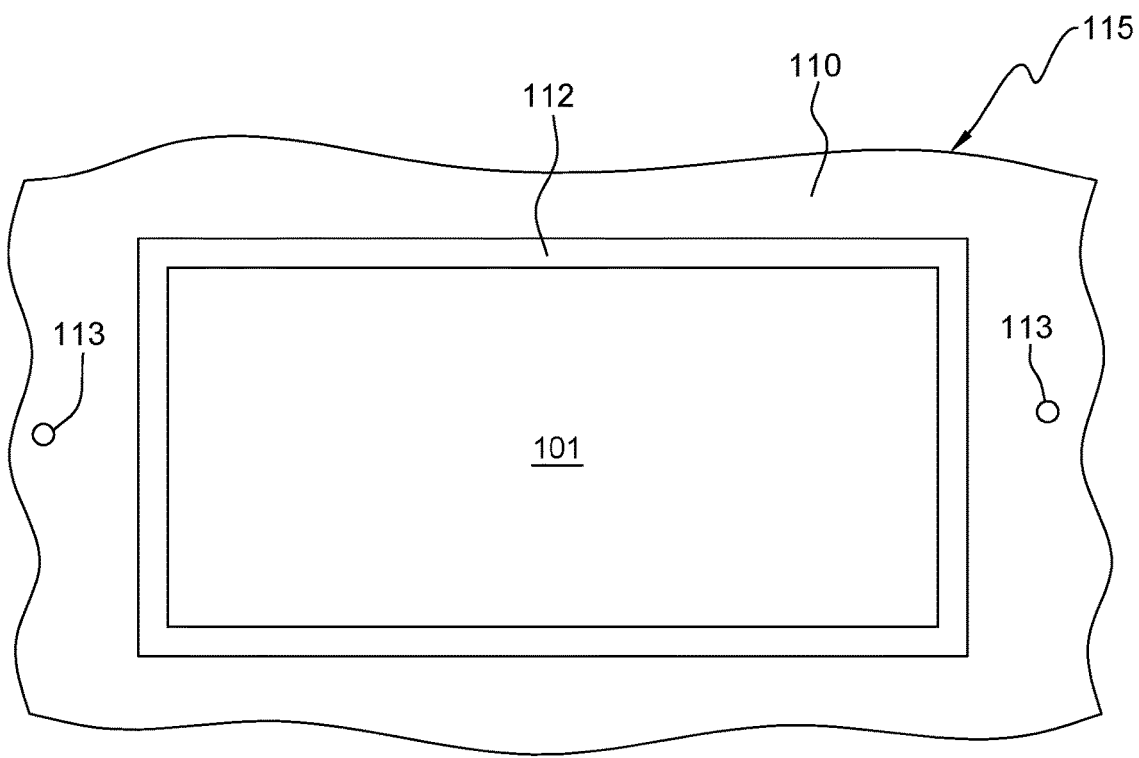
FIG. 1B is a top plan view of the multilayer circuit board of FIG. 1A, in accordance with one or more aspects of the present invention.

FIGS. 1A & 1B depict one embodiment of a tamper-proof electronic package or tamper-respondent assembly 100 which includes one or more electronic components, such as a circuit 115 and/or electronic devices (or elements) 102 coupled to a multilayer circuit board 110.

Referring collectively to FIGS. 1A & 1B, circuit 115 resides on or is embedded within multilayer circuit board 110, which also has an embedded tamper-respondent sensor 111 that facilitates defining, in part, a secure volume 101 associated with multilayer circuit board 110 that (in one or more embodiments) extends into multilayer circuit board 110. In particular, in the embodiment of FIGS. 1A & 1B, secure volume 101 can exist partially within multilayer circuit board 110, and partially above multilayer circuit board 110. One or more electronic devices 102 are mounted to multilayer circuit board 110 within secure volume 101 and can include, for instance, one or more encryption modules and/or decryption modules, and/or associated components, to be protected within the tamper-proof electronic package. In one or more implementations, the one or more electronic components to be protected can include, for instance, components of a secure communications card of a computer system.

Tamper-proof electronic package 100 further includes an enclosure 120, such as a pedestal-type enclosure, mounted to multilayer circuit board 110 within, for instance, a continuous groove (or trench) 112 formed within an upper surface of multilayer circuit board 110, and secured to the multilayer circuit board 110 via, for instance, a structural adhesive disposed within continuous groove 112. In one or more embodiments, enclosure 120 can be made of a thermally conductive material and operate as a heat sink for facilitating cooling of the one or more electronic components 102 within the secure volume. A security mesh or tamper-respondent sensor 121 can be associated with enclosure 120, for example, wrapping around the inner surface of enclosure 120, to facilitate defining, in combination with tamper-respondent sensor 111 embedded within multilayer circuit board 110, secure volume 101. In one or more other implementations, enclosure 120 can be securely affixed to a surface of multilayer circuit board 110 (without a continuous groove) using, for instance, a bonding material such as an epoxy or other adhesive.

Briefly described, tamper-respondent sensor 121 can include, in one or more examples, one or more tamper-detection layers which include circuit lines or traces provided on one or both sides of a structural layer, which in one or more implementations, can be a flexible insulating layer or film. The circuit lines on one or both sides of the flexible layer can be of a line width and have a pitch or line-to-line spacing such that piercing of the layer at any point results in damage to one or more of the circuit lines or traces. In one or more implementations, the circuit lines can define one or more conductors which can be electrically connected in a network to an enclosure monitor or detector 103, which monitors, for instance, resistance on the lines. Detection of a change in resistance caused by cutting or damaging one or more of the lines, will cause information within the secure volume to be automatically erased. The conductive lines of the tamper-respondent sensor can be in any desired pattern, such as a sinusoidal pattern, to make it more difficult to breach the tamper-detection layer without detection.

For resistive monitoring, a variety of materials can be employed to form the circuit lines. For instance, the circuit lines can be formed of a metal or metal alloy, such as copper, or silver, or can be formed, for example, of an intrinsically-conductive polymer, carbon ink, or nickel phosphorous (NiP), or Omega-ply®, offered by Omega Technologies, Inc., of Culver City, Calif. (USA), or Ticer™, offered by Ticer Technologies, Chandler, Ariz. (USA). The process employed to form the fine circuit lines or traces is dependent, in part, on the choice of materials used for the circuit lines. For instance, if copper circuit lines are fabricated, then additive processing, such as plating of copper traces, or subtractive processing, such as etching away unwanted copper between trace lines, can be employed.

As noted, in one or more implementations, the circuit lines of the tamper-respondent sensor(s) lining the inner surface(s) of enclosure 120, or even printed directly onto one or more layers formed over the inner surface of enclosure 120, can be connected to define one or more detect networks.

If a flexible layer is used over the inner surface of enclosure 120, then the flexible layer can be formed of a crystalline polymer material. For instance, the crystalline polymer could include polyvinylidene difluoride (PVDF), or Kapton, or other crystalline polymer material. Advantageously, a crystalline polymer can be made much thinner, while still maintaining structural integrity of the flexible substrate, which also allows for enhanced folding, and greater reliability of the sensor after folding.

As depicted in FIG. 1B, one or more external circuit connection vias 113 can be provided within multilayer circuit board 110 for electrically connecting to the one or more electronic components within secure volume 101. These one or more external circuit connection vias 113 can electrically connect to one or more external signal lines or planes (not shown) embedded within multilayer circuit board 110 and extending, for instance, into a secure base region of (or below) secure volume 101. Electrical connections to and from secure volume 101 can be provided by coupling to such external signal lines or planes within the multilayer circuit board 110.

As noted, secure volume 101 can be sized to house one or more electronic components to be protected, and can be constructed to extend into multilayer circuit board 110. In one or more implementations, multilayer circuit board 110 includes electrical interconnect within the secure volume 101 defined in the board, for instance, for electrically connecting one or more tamper-detection layers of the embedded tamper-respondent sensor 111 to associated monitor circuitry also disposed within secure volume 101, along with, for instance, one or more daughter cards, such as memory DIMMs, PCIe cards, processor cards, etc.

Note that the packaging embodiment depicted in FIGS. 1A & 1B is presented by way of example only. Other configurations of enclosure 120, or multilayer circuit board 110 can be employed, and/or other approaches to coupling enclosure 120 and multilayer circuit board 110 can be used. For instance, in one or more alternate implementations, enclosure 120 can be securely affixed to an upper surface of multilayer circuit board 110 (without a continuous groove) using, for instance, a structural bonding material such as an epoxy or other adhesive.

Figure 2:
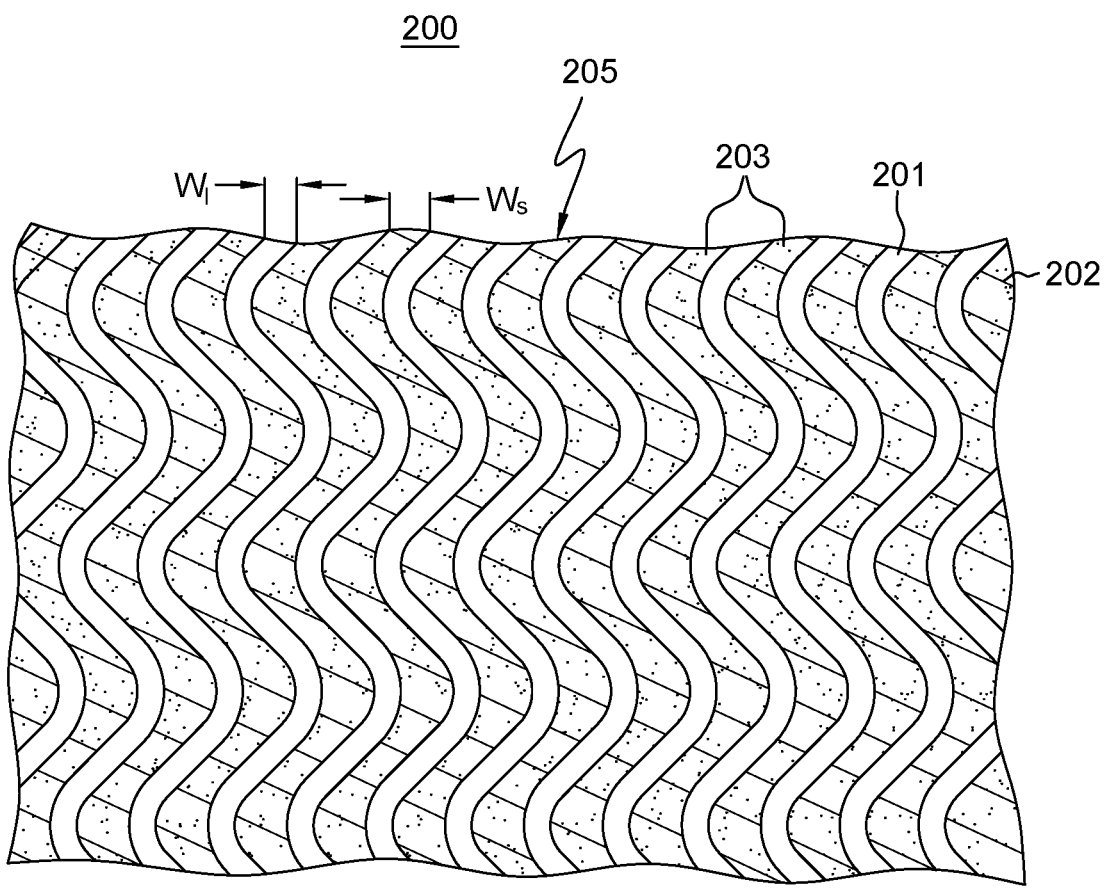
FIG. 2 depicts one embodiment of a tamper-respondent sensor with conductive lines forming, at least in part, at least one tamper-detect circuit, in accordance with one or more aspects of the present invention.

FIG. 2 depicts a portion of one embodiment of a tamper-detection layer 205 (or laser and pierce-respondent layer) of a tamper-respondent sensor 200 or security sensor. In FIG. 2, tamper-detection layer 205 includes circuit lines or traces 201 provided on one or both opposite sides of a layer, such as a flexible layer 202, which in one or more embodiments, may be a flexible insulating layer or film.

FIG. 2 illustrates circuit lines 201 on, for instance, one side of flexible layer 202, with the traces on the opposite side of the film being, for instance, the same pattern, but (in one or more embodiments) offset to lie directly below spaces 203, between circuit lines 201. As described below, the circuit lines on one side of the flexible layer may be of a line width $W_l$ and have a pitch or line-to-line spacing $W_s$ such that piercing of the layer 205 at any point results in damage to at least one of the circuit lines traces 201. In one or more implementations, the circuit lines can be electrically connected in-series or parallel to define one or more conductors which can be electrically connected in a network to an enclosure monitor, which may, in one or more implementations, monitor the resistance of the lines. Detection of an increase, or other change, in resistance, caused by cutting or damaging one of the traces, will cause information within the encryption and/or decryption module to be erased. Providing conductive lines 201 in a pattern, such as a sinusoidal pattern, can advantageously make it more difficult to breach tamper-detection layer 205 without detection. Note, in this regard, that conductive lines 201 could be provided in any desired pattern. For instance, in an alternate implementation, conductive lines 201 could be provided as parallel, straight conductive lines, if desired, and the pattern or orientation of the pattern may vary between sides of a layer, and/or between layers.

As noted, as intrusion technology continues to evolve, anti-intrusion technology needs to continue to improve to stay ahead. In one or more implementations, the above-summarized tamper-respondent sensor 200 of FIG. 2 can cover or line an inner surface of an enclosure to provide a secure volume about at least one electronic component to be protected. Further, the tamper-respondent sensor, or more particularly, the tamper-detect circuit(s) of the sensor, could be embedded within a multilayer circuit board described below.

Note also that a variety of materials can advantageously be employed to form the circuit lines when implemented using resistance monitoring. For instance, the circuit lines can be formed of a conductive ink (such as a carbon-loaded conductive ink) printed onto one or both opposite sides of one or more of the flexible layers 202 in a stack of such layers. Alternatively, a metal or metal alloy could be used to form the circuit lines, such as copper, silver, intrinsically conductive polymers, carbon ink, or nickel-phosphorus (NiP), such as Omega-Ply®, offered by Omega Technologies, Inc. of Culver City, Calif. (USA), or nickel-chrome, such as Ticer™ offered by Ticer Technologies, Chandler, Ariz. (USA). Note that the process employed to form the fine circuit lines or traces on the order described herein is dependent, in part, on the choice of material used for the circuit lines. For instance, if copper circuit lines are being fabricated, then additive processing, such as plating up copper traces, or subtractive processing, such as etching away unwanted copper between trace lines, can be employed.

Figure 3:
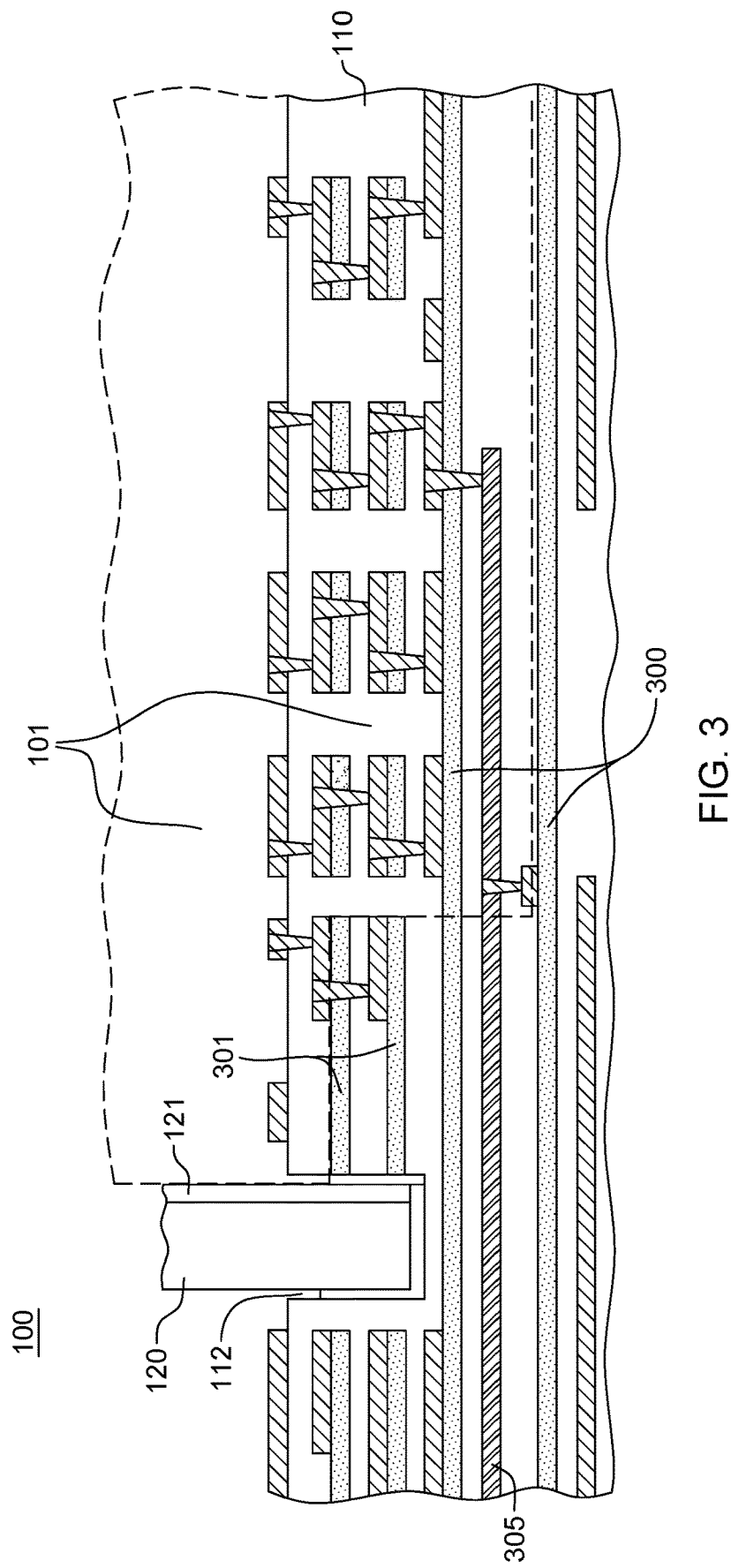
FIG. 3 is a partial cross-sectional elevational view of a more detailed embodiment of the tamper-respondent assembly of FIGS. 1A & 1B, including (in part), an enclosure and a multilayer circuit board with embedded tamper-detect circuits, in accordance with one or more aspects of the present invention.

By way of further example, FIG. 3 depicts a partial cross-sectional elevational view of a more detailed embodiment of tamper-proof electronic package 100, and in particular, of multilayer circuit board 110, to which enclosure 120 is secured. In this configuration, the embedded tamper-respondent sensor includes multiple tamper-detection layers including, by way of example, at least one tamper-detection mat (or base) layer 300, and at least one tamper-detection frame 301. In the example depicted, two tamper-detection mat layers 300 and two tamper-detection frames 301 are illustrated, by way of example only. The lower-most tamper-detection mat layer 300 can be a continuous sense or detect layer extending completely below the secure volume being defined within and/or above multilayer circuit board 110. One or both tamper-detection mat layers 300 below secure volume 101 can be partitioned into multiple circuit zones, if desired. Within each tamper-detection mat layer, or more particularly, within each circuit zone of each tamper-detection mat layer, multiple circuits or conductive traces can be provided in any desired configuration. Further, the conductive traces within the tamper-detection layers can be implemented as, for instance, a resistive layer.

As illustrated, one or more external signal lines or planes 305 can enter secure volume 101 between, in one embodiment, two tamper-detection mat layers 300, and then electrically connect upwards into the secure volume 101 through one or more conductive vias, arranged in any desired location and pattern. In the configuration depicted, the one or more tamper-detection frames 301 are disposed at least inside of the area defined by continuous groove 112 accommodating the base of enclosure 120. Together with the tamper-respondent sensor(s) 121 associated with enclosure 120, tamper-detection frames 301, and tamper-detection mat layers 300, define secure volume 101, which can extend, in part, into multilayer circuit board 110. With secure volume 101 defined, in part, within multilayer circuit board 110, the external signal line(s) 305 can be securely electrically connected to, for instance, the one or more electronic components mounted to, or of, multilayer circuit board 110 within secure volume 101. In addition, secure volume 101 can accommodate electrical interconnection of the conductive traces of the multiple tamper-detection layers 300, 301, for instance, via appropriate monitor circuitry.

Added security can be provided by extending tamper-detection mat layers 300 (and if desired, tamper-detection frames 301) outward past the periphery of enclosure 120. In this manner, a line of attack can be made more difficult at the interface between enclosure 120 and multilayer circuit board 110 since the attack would need to clear, for instance, tamper-detection mat layers 300, the enclosure 120, as well as the tamper-detection frames 301 of the embedded tamper-detect circuit.

Numerous variations on multilayer circuit board 110 of FIGS. 1A-2 are possible. For instance, in one embodiment, the embedded tamper-detect circuit can include one or more tamper-detection mat layers 300 and one or more tamper-detection frames 301, such as described above, and a tri-plate structure comprising one or more external signal lines or layers sandwiched between an upper ground plane and a lower ground plane. In this configuration, high-speed transfer of signals to and from the secure volume, and in particular, to and from the one or more electronic components resident within the secure volume, can be facilitated.

Note also that, once the secure volume is defined, conductive vias within the secure volume between layers of multilayer circuit board 110 can be either aligned, or offset, as desired, dependent upon the implementation. Alignment of conductive vias can facilitate, for instance, providing a shortest connection path, while offsetting conductive vias between layers can further enhance security of the tamper-proof electronic package by making an attack into the secure volume through or around one or more tamper-detection layers of the multiple tamper-detection layers more difficult.

The tamper-detection layers of the embedded tamper-detect circuit formed within the multilayer circuit board of the electronic circuit or electronic package can include multiple conductive traces or lines formed between, for instance, respective sets of input and output contacts or vias at the trace termination points. Any pattern and any number of conductive traces or circuits can be employed in defining a tamper-detection layer or a tamper-detection circuit zone within a tamper-detection layer. For instance, 4, 6, 8, etc., conductive traces can be formed in parallel (or otherwise) within a given tamper-detection layer or circuit zone between the respective sets of input and output contacts to those conductive traces.

Figure 4:
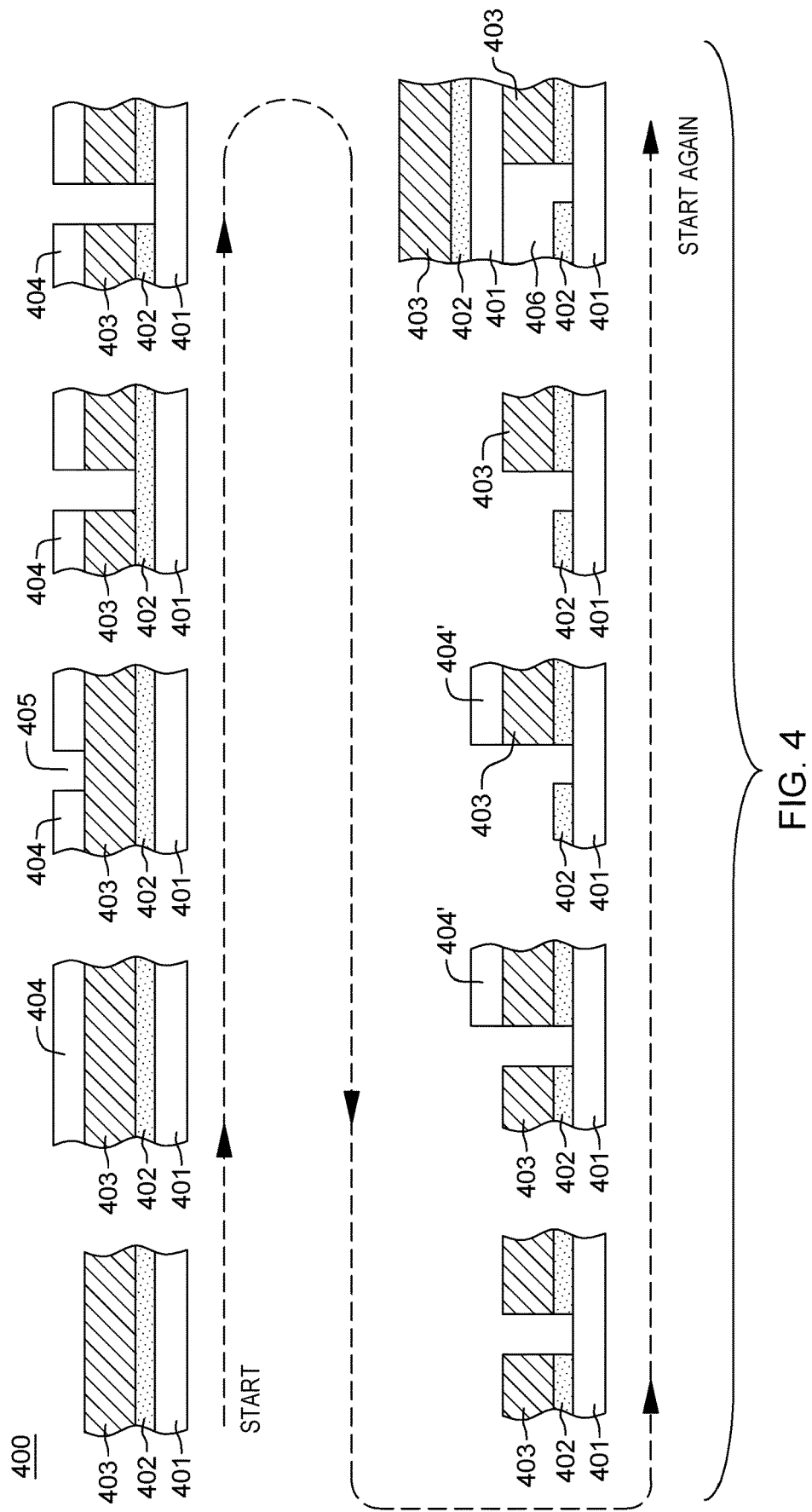
FIG. 4 depicts one embodiment of a process of fabricating a multilayer circuit board with an embedded tamper-detect circuit, in accordance with one or more aspects of the present invention.

In one or more implementations, the multilayer circuit board can be a multilayer wiring board or printed circuit board, or card, formed, for instance, by building up the multiple layers of the board. FIG. 4 illustrates one embodiment for forming and patterning a tamper-detection layer within such a multilayer circuit board.

As illustrated in FIG. 4, in one or more implementations, a tamper-detection layer, such as a tamper-detection mat layer or a tamper-detection frame disclosed herein, can be formed by providing a material stack comprising, at least in part, a structural layer 401, such as a pre-preg (or pre-impregnated) material layer, a trace material layer 402 for use in defining the desired trace patterns, and an overlying conductive material layer 403, to be patterned to define conductive contacts or vias electrically connecting to the pattern of traces being formed within the trace material layer 402, for instance, at trace terminal points. In one or more implementations, the trace material layer 402 can include nickel phosphorous (NiP), and the overlying conductive layer 403 can include copper. Note that these materials are identified by way of example only, and that other trace and/or conductive materials may be used within the build-up 400.

A first photoresist 404 is provided over build-up 400, and patterned with one or more openings 405, through which the overlying conductive layer 403 can be etched. Depending on the materials employed, and the etch processes used, a second etch process can be desired to remove portions of trace material layer 402 to define the conductive traces of the subject tamper-detection layer. First photoresist 404 can then be removed, and a second photoresist 404' is provided over the conductive layer 403 features to remain, such as the input and output contacts. Exposed portions of conductive layer 403 are then etched, and the second photoresist 404' can be removed, with any opening in the layer being filled, for instance, with an adhesive (or pre-preg) 406 and a next build-up layer is provided, as shown. Note that in this implementation, most of overlying conductive layer 403 is etched away, with only the conductive contacts or vias remaining where desired, for instance, at the terminal points of the traces formed within the layer by the patterning of the trace material layer 402. Note that any of a variety of materials can be employed to form the conductive lines or traces within a tamper-detection layer. Nickel-phosphorous (NiP) is particularly advantageous as a material since it is resistant to contact by solder, or use of a conductive adhesive to bond to it, making it harder to bridge from one circuit or trace to the next during an attempt to penetrate into the protected secure volume of the electronic circuit. Other materials which can be employed include OhmegaPly®, offered by Ohmega Technologies, Inc., of Culver City, Calif. (USA), or Ticer™, offered by Ticer Technologies of Chandler, Ariz. (USA).

The trace lines or circuits within the tamper-detection layers, and in particular, the tamper-detection circuit zones, of the embedded tamper-detect circuit, along with the tamper detector monitoring the enclosure, can be electrically connected to detect or compare circuitry provided, for instance, within secure volume 101 (FIG. 1A) of the tamper-proof electronic package. The detect or monitor circuitry can include various bridges or compare circuits, and conventional printed wiring board electrical interconnect inside secure volume 101 (FIG. 1A), for instance, located within the secure volume defined by the tamper-detection frames 301 (FIG. 3), and the tamper-detection mat layers 300 (FIG. 3).

Note that advantageously, different tamper-detection circuit zones on different tamper-detection layers can be electrically interconnected into, for instance, the same detect circuitry. Thus, any of a large number of interconnect configurations may be possible. For instance, if each of two tamper-detection mat layers contains 30 tamper-detection circuit zones, and each of two tamper-detection frames contains 4 tamper-detection circuit zones, then, for instance, the resultant 68 tamper-detection circuit zones can be connected in any configuration within the secure volume to create the desired arrangement of circuit networks within the secure volume being monitored for changes in resistance or tampering. Note in this regard, that the power supply or battery for the tamper-respondent sensor(s) can be located internal or external to the secure volume, with the sensor being configured to trip and destroy any protected or critical data if the power supply or battery is tampered with.

Figure 5:
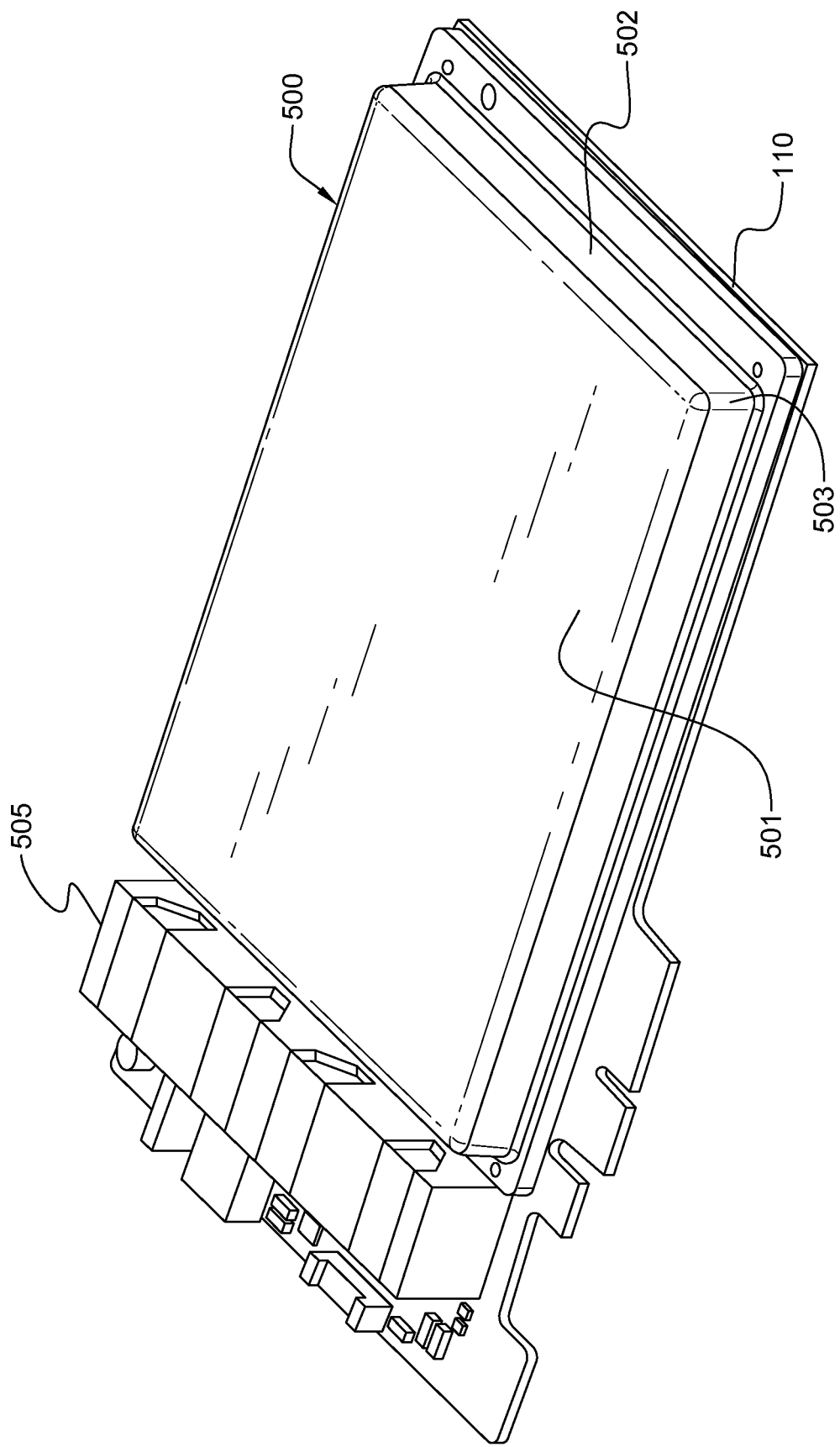
FIG. 5 is an isometric view of one embodiment of a tamper-respondent assembly, in accordance with one or more aspects of the present invention.

By way of further example, an isometric view of one embodiment of a tamper-proof electronic package is depicted in FIG. 5, wherein an enclosure 500 (such as enclosure 120 of FIG. 1A, or the enclosures described below in connection with FIGS. 6A-11) is shown sealed to multilayer circuit board 110 to define a secure volume about one or more electronic components. In the embodiment depicted, enclosure 500 is formed of a thermally conductive material, and includes a main surface 501 and sidewall(s) 502 which include sidewall corners 503. An inner surface of enclosure 500 would include an inner main surface, and an inner sidewall surface corresponding to main surface 501 and sidewall(s) 502 respectively, with the inner main surface and inner sidewall surfaces being covered, in one embodiment, by one or more tamper-respondent sensors, that is, in an embodiment such as described above in connection with FIGS. 1A-2. A power supply 505 or battery for the tamper-respondent sensor can be located, as depicted in this embodiment, external to the secure volume, with the tamper detector being configured to trip and destroy any protected or critical data if the power supply or battery is tampered with. Enclosure 500 can be adhered to multilayer circuit board 110, which as noted herein, can include its own tamper protection.

With increased use of encryption and decryption in computing systems, power use within tamper-respondent assemblies such as described herein is expected to continue to increase. As a result, heat dissipation within the tamper-respondent assemblies is becoming an issue. With a design such as illustrated in FIGS. 1A-2, multiple layers of potentially high thermal impedance exist between the electronic components producing heat and the outer thermally conductive enclosure. In view of this constraint, novel tamper-respondent assemblies and methods of fabrication are disclosed herein which provide both enhanced tamper-proof protection and enhanced heat transfer from electronic components within the secure volume to, for instance, a heat sink, such as a plurality of air-cooled fins on an outer surface of the enclosure.

When considering tamper-proof packaging, the electronic package needs to achieve defined tamper-proof requirements, such as those set forth in the National Institutes of Standards and Technology (NIST) Publication FIPS 140-2, which is a U.S. Government Computer Security Standard, used to accredit cryptographic modules. The NIST FIPS 140-2 defines four levels of security, named Level 1 to Level 4, with Security Level 1 providing the lowest level of security, and Security Level 4 providing the highest level of security. At Security Level 4, physical security mechanisms are provided to establish a complete envelope of protection around the cryptographic module, with the intent of detecting and responding to any unauthorized attempt at physical access. Penetration of the cryptographic module enclosure from any direction has a very high probability of being detected, resulting in the immediate zeroization of all plain text critical security parameters (CSPs).

To address the demands for ever-improving anti-intrusion technology, and the higher-performance encryption/decryption functions being provided, enhancements to a Security Level 4 tamper-proof, tamper-evident packaging for one or more electronic components or assemblies are desired.

Disclosed hereinbelow with reference to FIGS. 6A-11 are various tamper-proof assemblies and methods of fabrication which provide, for instance, a Security Level 4 secure volume for accommodating one or more electronic components, such as one or more encryption and/or decryption modules and associated components of, for instance, a communications card or other electronic assembly to be protected, and which provide enhanced transfer of heat generated within the secure volume outward through the enclosure.

Figure 6A:
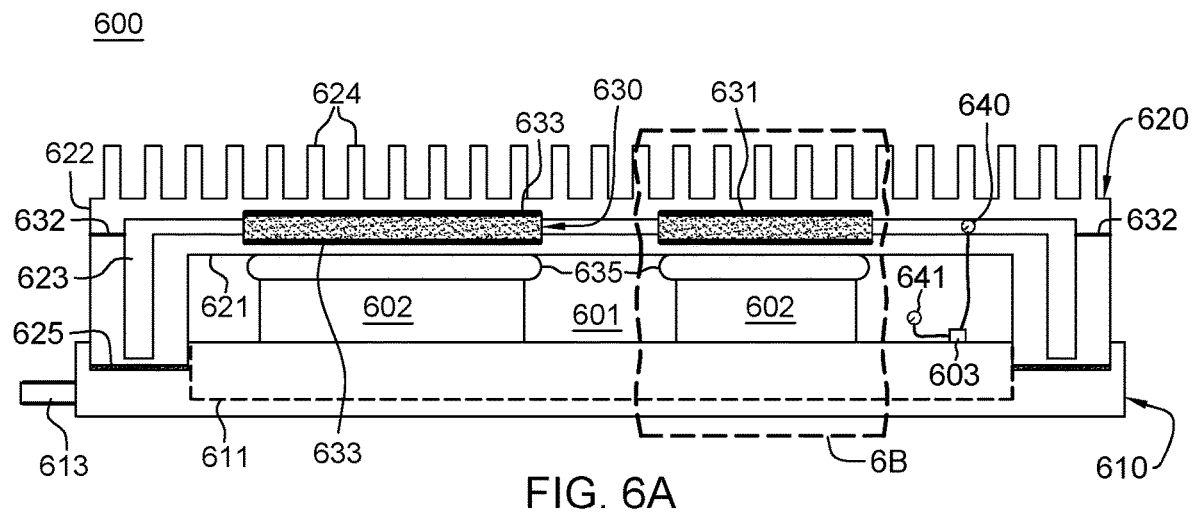
FIG. 6A is a cross-sectional elevational view of another embodiment of a tamper-respondent assembly (such as shown in FIG. 5) with porous heat transfer elements, in accordance with one or more aspects of the present invention.
Figure 6B:
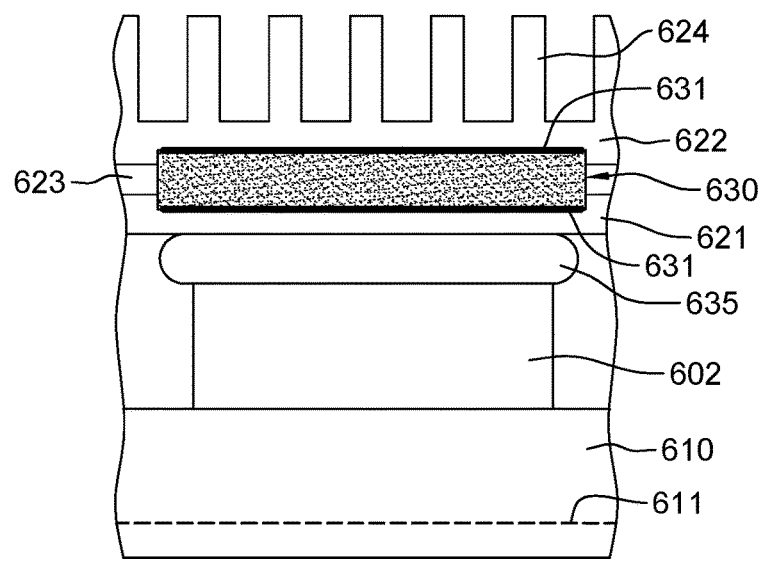
FIG. 6B is an enlarged partial depiction of the tamper-respondent assembly of FIG. 6A, taken along line 6B, in accordance with one or more aspects of the present invention.

By way of example, FIGS. 6A & 6B depict one embodiment of a tamper-respondent assembly 600, in accordance with one or more aspects disclosed herein. Referring collectively to FIGS. 6A & 6B, tamper-respondent assembly 600 includes a multilayer circuit board 610 with one or more electronic components 602 coupled to a main surface of the circuit board, such as an upper surface of the circuit board. In one or more implementations, multilayer circuit board 610 and one or more electronic components 602 are similar to multilayer circuit board 110 and one or more electronic components 102 described above in connection with FIGS. 1A-5. For instance, multilayer circuit board 610 includes, in one embodiment, an embedded tamper-respondent sensor 611 similar to embedded tamper-respondent sensor 111 described above in connection with FIGS. 1A-4. In one or more implementations, electronic component 602 includes one or more application-specific integrated circuits to be protected. As illustrated, in one or more embodiments, a peripheral component interconnect (PCI) tab 613 or bus can be provided from multilayer circuit board 610 to connect to internal components and/or circuitry of the multilayer circuit board.

In one embodiment, tamper-respondent assembly 600 includes an enclosure assembly mounted to circuit board 610, such as within a continuous groove (or trench) 612 formed within the upper surface of multilayer circuit board 610, and secured to multilayer circuit board 610 via, for instance, a structural adhesive 625 disposed within continuous groove 612. In one or more embodiments, the enclosure assembly includes an enclosure 620 made of a thermally conductive material, such as a metal material, which operates as a heat sink to facilitate cooling electronic components 602 within a secure volume 601 defined by the enclosure assembly and the circuit board. In one or more embodiments, a plurality of air-cooled fins or pins 624 extend outward from enclosure 620 to facilitate dissipation of heat from enclosure 620.

In the embodiment illustrated, tamper detection is implemented using pressure sensing, and in particular, detection of a change in pressure, or a change in a pressure differential. This pressure-sensing approach replaces the security mesh or tamper-respondent sensor associated with the inner surface of the enclosure of FIGS. 1A-2. For instance, in one or more embodiments, enclosure 620 includes a sealed inner compartment or space 623 between an inner wall 621 and an outer wall 622 of enclosure 620.

In one embodiment, sealed inner compartment 623 is defined or formed as a gap between inner wall 621 and outer wall 622. As explained below, thermally conductive enclosure 620 can be fabricated, in one embodiment, from a base thermally conductive element and an upper thermally conductive element, which are sealed together, such as by solder or braze 632, resulting in inner wall 621 and outer wall 622. In an alternate fabrication approach, 3D printing could be used to form one or more structures of, for instance, enclosure 620.

Multiple pressure sensors 640, 641 are also provided. In the embodiment illustrated, pressure sensor 640 is positioned to sense pressure within sealed inner compartment 623 of enclosure 620, and pressure sensor 641 is positioned to sense pressure within secure volume 601, with a monitor circuit or module 603 also being provided within or on multilayer circuit board 610. Pressure sensors 640, 641 provide sensed pressure data that is monitored by the monitor circuit to identify a change in pressure or change in pressure differential indicative of a tamper event. For instance, a change in pressure within sealed inner compartment 623 occurs when, for instance, the secure volume 601 is attempted to be breached by drilling through enclosure 620. Note that the pressure change can be detected in a variety of manners. For instance, a pressure differential between sensor data from sensor 640 at different time intervals can be indicative of a tamper event. Alternatively, a sensed pressure differential between pressure sensor 640 and pressure sensor 641 can be used to identify a pressure change indicative of a tamper event. In one or more embodiments, the pressure within sealed inner compartment 623 will be set different from the pressure within secure volume 601, as explained further below. Note that although illustrated as a single pressure sensor 640, multiple pressure sensors could be provided within sealed inner compartment 623, and/or within secure volume 601, if desired.

In one or more implementations, the enclosure assembly further includes one or more porous heat transfer elements 630 within sealed inner compartment 623 that are each sized and located relative to a respective electronic component to facilitate conducting heat from the respective electronic component 602 within secure volume 601 across sealed inner compartment 623 of the thermally conductive enclosure 620. A thermal interface material (TIM) 635 is used to facilitate heat transfer from the respective electronic component 602 to inner wall 621, and hence across porous heat transfer element 630 to outer wall 622, for dissipation across thermally conductive fins 624. As discussed further below, in one embodiment, porous heat transfer element 630 includes a porous material 800 (FIG. 8A) sandwiched between upper and lower foils 801, 802 (FIGS. 8A & 8B), and is adhered to inner wall 621 and outer wall 622 within sealed inner compartment 623 of enclosure 620, such as within respective recesses formed within inner wall 621 and outer wall 622, as illustrated. In one embodiment, porous heat transfer element 630 is adhered to the inner and outer walls using a solder or braze joint 633.

Advantageously, porous heat transfer element 630 is gas-permeable and is designed with sufficient porosity that an attempted drilling through enclosure 620 into porous heat transfer element 630, results in a change in pressure within sealed inner compartment 623 that is detected by pressure sensor 640. In this manner, the porous heat transfer element maintains the anti-tamper functionality of the enclosure assembly, while still providing high thermal conductivity of heat being transferred from a respective heat-generating electronic component across the sealed inner compartment of the enclosure. Note that a tamper-respondent assembly such as depicted in FIGS. 6A & 6B, advantageously provides fewer component layers, and thus fewer heat transfer interfaces, from the heat-generating electronic component(s) within secure volume 601 outward through the enclosure 620. Note also that, in the implementation of FIGS. 6A & 6B, porous heat transfer elements 630 are sized and located relative to the respective electronic component to be cooled. For instance, in one implementation, the porous heat transfer elements overlie and have a footprint substantially the same or slightly larger (e.g., <25% larger) than the footprint of the respective electronic component to be cooled. This allows a significant portion of the sealed inner compartment to remain an air or gas-filled space.

Figure 7A:
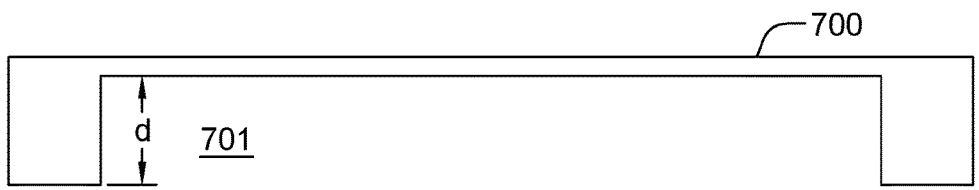
FIGS. 7A-7E depict one embodiment of a process of fabricating an enclosure assembly for a tamper-respondent assembly with porous heat transfer elements, such as depicted in FIGS. 6A & 6B, in accordance with one or more aspects of the present invention.

FIGS. 7A-7E depict one embodiment of a process of fabricating an enclosure assembly, such as illustrated in FIGS. 6A & 6B. As illustrated in FIG. 7A, a base thermally conductive element 700 is preformed, such as by using a punch machine or a trenching operation, to have an inner space 701 that is to form a portion of a secure volume. In one specific embodiment, the inner space or depth of channel (d) can be, for instance, in a range of 4-5 mm.

Figure 7B:
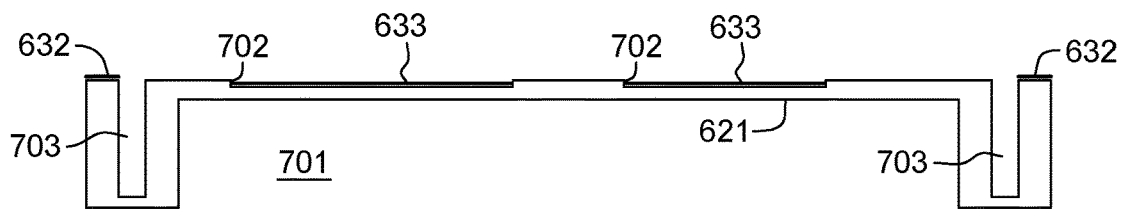
Figure 7C:
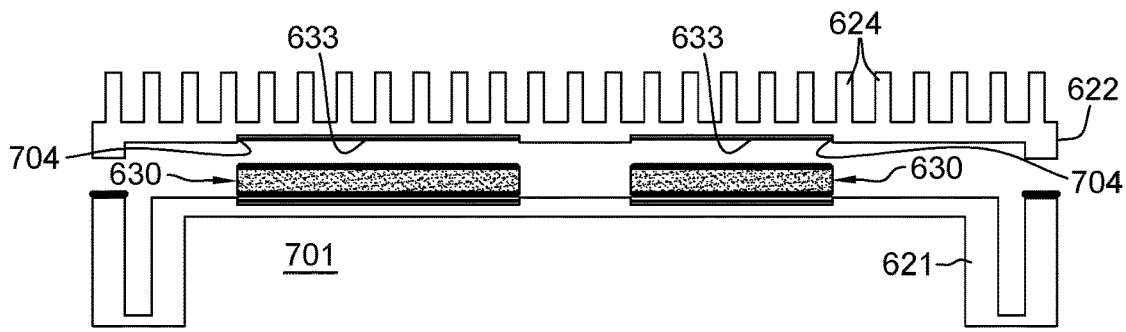
Figure 7D:
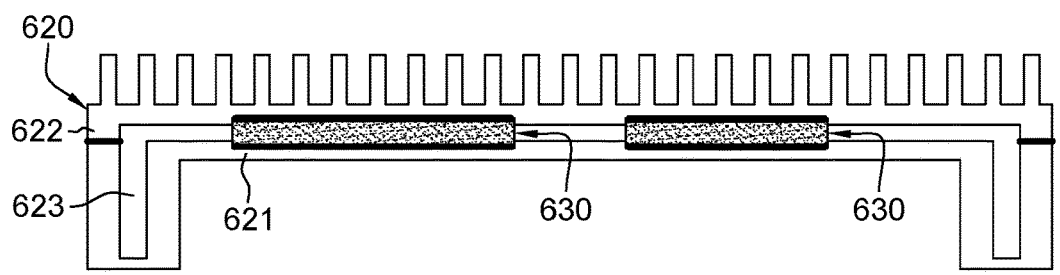

As illustrated in FIG. 7B, the base thermally conductive element can undergo further operations, such as further punching or trenching operations, to form recesses 702, which are positioned and sized to overlie a respective electronic component to be cooled, as well as a channel or gap 703, which will form a portion of the sealed inner compartment of the thermally conductive enclosure once assembled. Further, solder and/or braze paste 633, 632 is applied, with solder or braze paste 633 residing within recesses 702 to accommodate the respective porous heat transfer elements, and solder or braze paste 632 being provided to facilitate connecting the base thermally conductive element to an upper thermally conductive element, which once connected, forms a portion of outer wall 622, as illustrated in FIGS. 7C & 7D. Note that as illustrated in FIG. 7C, the upper thermally conductive element also undergoes operations, such as punching or trenching, to form thermally conductive fins 634 extending outward from the outer wall 622, and one or more recesses 704 sized and positioned to receive, in part, a respective porous heat transfer element 630.

Figure 8A:
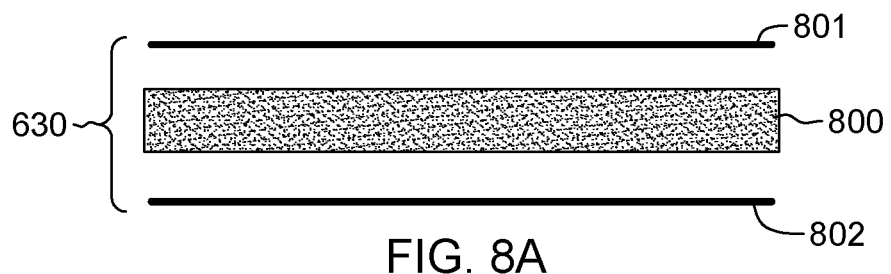
FIGS. 8A & 8B depict one embodiment of a process of fabricating a porous heat transfer element for use in an enclosure assembly such as depicted in FIGS. 6A & 6B, in accordance with one or more aspects of the present invention.
Figure 8B:

Referring to FIGS. 8A & 8B, one embodiment of porous heat transfer element 630 is depicted. In this embodiment, porous heat transfer element 630 includes a porous material 800 and an upper metal foil 801 and lower metal foil 802. In one implementation, porous material 800 is a sintered metal structure, such as a sintered copper block or pad, and upper and lower metal foils are upper and lower copper foils. Porous material 800, which can be formed by sintering metal particles, includes voids so as to be gas-permeable. Further, in one or more implementations, porous material 800 is approximately the same thickness as the gap between the inner wall and outer wall of the enclosure defining the sealed inner compartment. For instance, in one embodiment, porous material 800 has a thickness of approximately 2-4 mm, in the case where the sealed inner compartment is defined by a gap of approximately 2 mm between the inner and outer walls. Further, in one implementation, the upper and lower metal foils 801, 802 can each have a thickness of 1 mm or less. In one specific implementation, the porous material, such as sintered metal block, has a thickness of approximately 3 mm, and the metal foils have a thickness of, for instance, less than 1 mm, such as approximately 0.5 mm each.

In one or more embodiments, the porous material is a sintered metal structure with opened pores, that is air and liquid-permeable. The particle size and pore size are controllable during fabrication to, for instance, below 50 μm size. In one or more embodiments, the porous material has a porosity in the range of 30%-80%, such as a porosity of 50%. The thermal conductivity of the porous heat transfer element can be adjusted during fabrication by controlling the particle size and density of the metal particles in the sintered block.

In one implementation, porous heat transfer element 630 can be produced by sintering the porous material between the upper and lower metal foils 801, 802, as illustrated in FIG. 8B. In one or more other embodiments, the upper and lower metal foils can be bonded to the porous material 800, such as a sintered metal block.

Advantageously, the upper and lower metal foils are provided to prevent solder or braze material from penetrating into the porous material when being bonded in position within the thermally conductive enclosure. This advantageously prevents clogging of the porous material during the soldering or brazing process used to secure porous heat transfer element 630 to the inner wall and outer wall of the enclosure.

Note that, in one or more implementations, recesses 702, 704 in the base thermally conductive element and upper thermally conductive element, defining the inner and outer walls of the enclosure, are sized with a depth to substantially accommodate the solder and/or braze sheet or paste, as well as the respective metal foil of the porous heat transfer element so that, the space or gap between the inner and outer walls contains mostly, or only, the porous material, which enhances the ability of the pressure sensor to detect a pressure change indicative of a tamper event through the porous heat transfer element.

Returning to FIG. 7D, a soldering or brazing process can be used to form the enclosure, including forming sealed inner compartment 623 between inner wall 621 and outer wall 622 of enclosure 620.

Figure 7E:
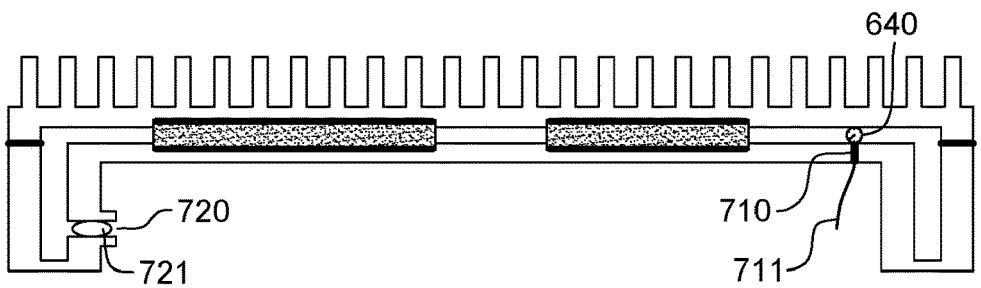

As illustrated in FIG. 7E, the enclosure assembly can further be fabricated to include pressure sensor 640 within sealed inner compartment 623, with one or more wires 711 extending outward from the enclosure to connect the pressure sensor to the monitor circuit, as illustrated in FIG. 6A. In one embodiment, the wire(s) 711 passes through an opening which includes a pressure seal 710. As illustrated, in one or more implementations, a port 720 is also provided to pressurize or depressurize inner sealed compartment 623 prior to mounting of the enclosure to the multilayer circuit board. For instance, in one embodiment, inner sealed compartment 623 can be pressurized to a pressure above atmospheric pressure, or in another embodiment, can be depressurized to, for instance, a pressure below atmospheric pressure, or even close to vacuum. Once pressurized or depressurized, port 720 is pressure-sealed with a fill material 721.

Figure 9:
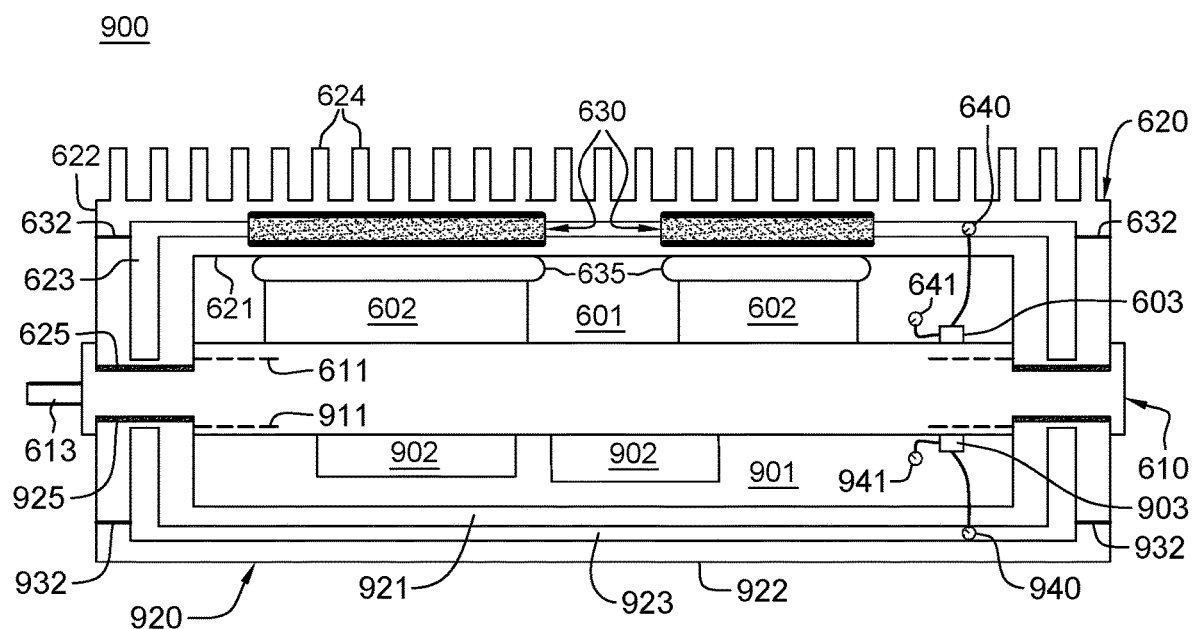
FIG. 9 is a cross-sectional elevational view of a further embodiment of a tamper-respondent assembly with one or more porous heat transfer elements, in accordance with one or more aspects of the present invention.
Figure 10A:
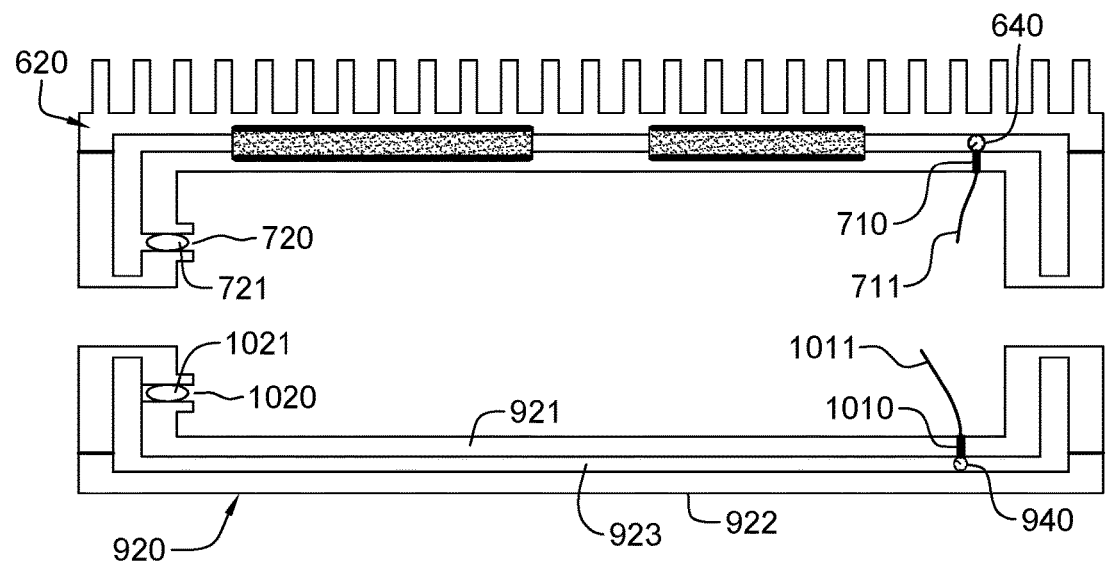
FIGS. 10A & 10B partially depict one embodiment of a process of fabricating an enclosure assembly for a tamper-respondent assembly with porous heat transfer elements, in accordance with one or more aspects of the present invention.
Figure 10B:
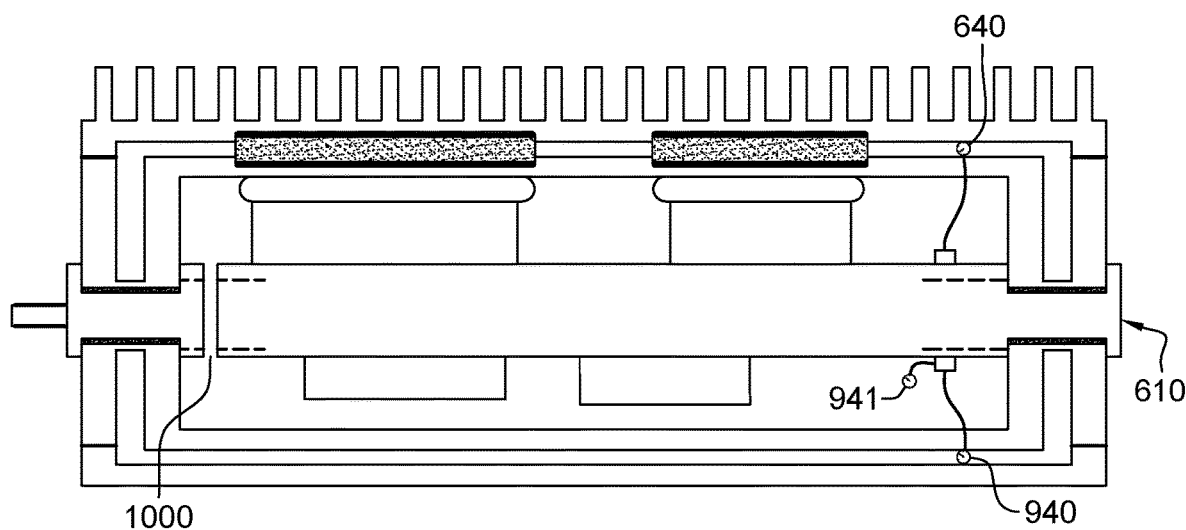
Figure 11:
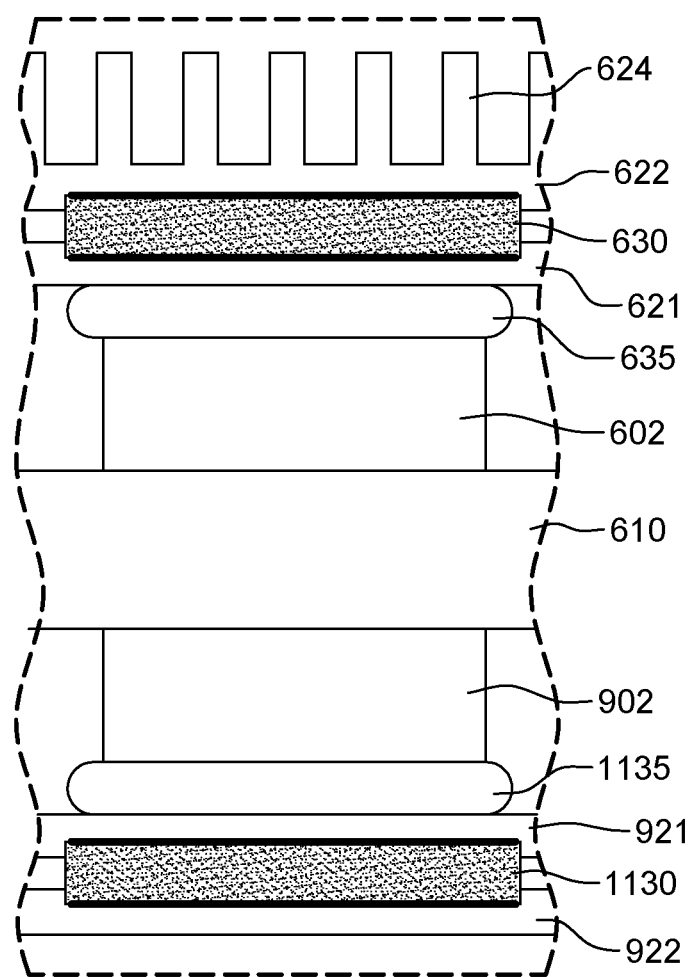
FIG. 11 is a partial cross-sectional representation of another embodiment of a tamper-respondent assembly with porous heat transfer elements, in accordance with one or more aspects of the present invention.

FIGS. 9-11 depict further embodiments of a tamper-respondent assembly, in accordance with one or more aspects of the present invention.

In the embodiment of FIG. 9, a tamper-respondent assembly 900 is shown similar to tamper-respondent assembly 600 of FIGS. 6A-8, with the exception that a second enclosure assembly is provided on a second main surface, or second side, of multilayer circuit board 610. As illustrated, the second enclosure assembly includes a second enclosure 920 with an inner wall 921 and outer wall 922 between which a sealed inner compartment 923 is defined. When the second enclosure is mounted to the second side of multilayer circuit board 610, for instance, within a respective trench in the second side of the multilayer circuit board, a second chamber 901 of the secure volume is defined to protect one or more electronic components 902 mounted to the second side of multilayer circuit board 610. As illustrated, in one or more embodiments, a tamper-respondent sensor 911, similar to tamper-respondent sensor 611, is embedded within multilayer circuit board 610 adjacent to the second side of the multilayer circuit board, in the vicinity of the trench accommodating the enclosure 920. As with enclosure 620, enclosure 920 can be securely affixed to multilayer circuit board 610 using, for instance, a bonding material such as an epoxy or other adhesive 925. Note that in this embodiment, embedded tamper-respondent sensors 611, 911 need only occupy a portion of the multilayer circuit board 610 in the vicinity of the trenches, such as shown. Together, the first and second enclosures 620, 920 define the secure volume 601, 901 on opposite sides of the circuit board, and the embedded tamper-respondent sensors protect against tampering along the enclosure-to-board interfaces.

In one or more implementations, the second enclosure assembly mounted to the second side of the multilayer circuit board is also formed of a base thermally conductive element and an upper thermally conductive element, in a manner similar to fabricating the thermally conductive enclosure 620, described above. As illustrated, a solder or braze joint 932 connects the base thermally conductive element and upper thermally conductive element, which defines the inner and outer walls 921, 922 of the enclosure, as well as the sealed inner compartment 923 between the inner and outer walls. In one or more embodiments, enclosure 900 is formed of a metal material to facilitate heat dissipation from within the respective secure volume between enclosure 920 and the second side of multilayer circuit board 610. Note that, in practice, a single secure volume can be obtained by enclosure 620 mounted to the first side of the multilayer circuit board and enclosure 920 mounted to the second side of the multilayer circuit board. One or more through-holes 1000 can be provided within the multilayer circuit board (as illustrated in FIG. 10B), such that pressure within the secure volume chamber over the first side of the multilayer circuit board and within the secure volume chamber over the second side of the multilayer circuit board is equal. In one embodiment, a pressure sensor 940 is provided within sealed inner compartment 923 of enclosure 920, and a pressure sensor 941 is provided within the second chamber 901 of the secure volume, with wires connecting the pressure sensors back to a monitor circuit 903 associated with multilayer circuit board 610 and/or a component coupled to multilayer circuit board 610, to monitor (along with monitor circuitry 603) a pressure change differential between one or more of the sealed inner compartments 623, 923, and the first and second chambers 601, 901 of the secure volume.

In one or more embodiments, any attempt to drill through one of the enclosures 620, 920 results in a pressure change, detected by one or more of the pressure sensors, which is used by the monitor circuit to trigger an alarm, and erase any confidential encryption and/or decryption data within the tamper-respondent assembly. For instance, drilling through enclosure 620 could result in pressure within the sealed inner compartment 623 changing, and being detected by the monitor circuitry monitoring a pressure differential between the pressure sensors associated with sealed inner compartment 623 and the first chamber of the secure volume (see FIGS. 6A & 6B). Drilling through enclosure 920 could similarly result in pressure within sealed inner compartment 923 changing relative to the second chamber 901 of the secure volume, which can be detected by the monitor circuitry.

FIGS. 10A & 10B build upon the fabrication process of FIGS. 7A-7E, with FIG. 10A further illustrating a second enclosure having been formed using similar fabrication processes to those described above in connection with FIGS. 7A-7E. In this embodiment, enclosure 920 is being fabricated to mount to the second side of a multilayer circuit board, as described above in connection with FIG. 9. As illustrated, second enclosure 920, includes a pressure sensor 940 with a wire 1011 extending from the pressure sensor through a respective opening in the inner wall which includes a pressure seal 1010. Further, a fill port 1020 is provided in inner wall 921 to allow pressurization or depressurization of sealed inner compartment 923 between the inner and outer walls, 921, 922 of enclosure 920. Once pressurized or depressurized, a port seal 1021 is applied to pressure-seal the fill port 1020. Note that instead of applying a high pressure (e.g., higher than 1 ATM pressure) to the sealed inner compartments 623, 923, a low pressure (e.g., lower than 1 ATM pressure) or a vacuum, can be used in the tamper-respondent assembly to facilitate the pressure sensing tamper-detect protection described herein. Advantageously, by providing a lower pressure within the sealed inner compartments, there will be a lower variation in compartment pressure at different operational temperatures.

FIG. 11 is a partial cross-sectional elevational view of a further tamper-respondent assembly, in accordance with one or more aspects of the present invention. As illustrated, the tamper-respondent assembly in this embodiment includes respective heat transfer paths from an electronic component 602 mounted to a first side of a multilayer circuit board 610 and from an electronic component 902 mounted to the second side of multilayer circuit board 610. The heat transfer path from electronic component 602 upward through porous heat transfer element 630 to the plurality of thermally conductive fins 624 is described above in connection with FIGS. 6A-9. In addition, in this configuration, a thermal interface material 1135 couples electronic component 902 to inner wall 921 of the second enclosure assembly, and a respective porous heat transfer element 1130 is sized and located to overlie electronic component 902 in the heat transfer path to provide enhanced thermal conductivity across the sealed inner compartment of the second enclosure defined between inner wall 921 and outer wall 922 of the second enclosure. Porous heat transfer element 1130 is the same or similar to porous heat transfer element 630 described above in connection with the embodiment of FIGS. 6A-10B.

Those skilled in the art will note that provided herein is a pressure-sensing implementation of a tamper-respondent assembly, in which one or more porous heat transfer elements are located within a sealed inner compartment of a thermally conductive enclosure. The porous heat transfer elements, which are sized and located to facilitate conducting heat from a respective electronic component across the sealed inner compartment of the thermally conductive enclosure, advantageously allow for tamper-proof protection by monitoring pressure to detect a change indicative of a tamper event, even where the tamper event involves drilling through the porous heat transfer element. In one or more implementations, the porous heat transfer element includes a porous material, such as a sintered metal, which has a porosity in the range of 30%-80%, such as, for instance, approximately 50% (in one embodiment). In a specific embodiment, the porous material is a sintered copper structure, which includes an upper and lower metal foil to block solder or braze from penetrating into the porous material when adhering the porous heat transfer element to the inner and outer walls of the enclosure. In one or more implementations, the porous heat transfer element is sized and located relative to the respective heat-generating electronic component such that only a portion of the sealed inner compartment within the enclosure contains the porous heat transfer element(s). Advantageously, the porous heat transfer element has solder or braze interfaces providing high-K interface for one or more heat-dissipating components within the secure volume of the enclosure. In practice, thermal performance of the porous heat transfer element can vary depending on pore size and resultant average void fraction, grain boundary resistance, etc. The design of the sintered metal structure can be adapted to mitigate the thermal impact of reduced conductivity of the sintered metal structure by using thicker, solid metal sections as the upper and lower metal foils, as needed. In one or more embodiments, the middle section includes the porous material that is exposed to, or in fluid communication with, the sealed inner compartment.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A tamper-respondent assembly comprising:
a circuit board, the circuit board including an electronic component;

an enclosure assembly mounted to the circuit board to enclose the electronic component within a secure volume, the enclosure assembly comprising:
- a thermally conductive enclosure with a sealed inner compartment within the thermally conductive enclosure, the thermally conductive enclosure being mounted to the circuit board;
- a porous heat transfer element within the sealed inner compartment of the thermally conductive enclosure, the porous heat transfer element being sized and located to facilitate conducting heat from the electronic component across the sealed inner compartment of the thermally conductive enclosure; and
- wherein the porous heat transfer element is selectively positioned within the sealed inner compartment of the thermally conductive enclosure to overlie the electronic component to facilitate conducting heat from the electronic component across the sealed inner compartment, and thereby through the thermally conductive enclosure; and
- a pressure sensor to sense pressure within the sealed inner compartment of the thermally conductive enclosure to facilitate identifying a pressure change indicative of a tamper event.

2. The tamper-respondent assembly of claim 1, wherein the porous heat transfer element comprises a porous material, and is sized and located relative to the electronic component to facilitate conducting heat from the electronic component across the sealed inner compartment of the thermally conductive enclosure.

3. The tamper-respondent assembly of claim 2, wherein the porous material has a porosity in a range of 30%-80%.

4. The tamper-respondent assembly of claim 2, wherein the porous material comprises a sintered metal structure.

5. The tamper-respondent assembly of claim 1, wherein the thermally conductive enclosure comprises an inner wall and an outer wall, the sealed inner compartment being located between the inner wall and the outer wall of the thermally conductive enclosure, and wherein the porous heat transfer element is bonded to the inner wall and the outer wall within the sealed inner compartment of the thermally conductive enclosure.

6. The tamper-respondent assembly of claim 5, wherein the porous heat transfer element comprises a porous material between a lower metal foil and an upper metal foil, and wherein the porous heat transfer element is soldered or brazed to the inner wall and the other outer wall of the thermally conductive enclosure, the lower metal foil and the upper metal foil preventing solder or braze material from penetrating into the porous material.

7. The tamper-respondent assembly of claim 5, wherein at least one wall of the inner wall and the outer wall of the thermally conductive enclosure comprises a recess, and the porous heat transfer element resides partially within the recess and is bonded to the at least one wall within the recess, and wherein the recess in the at least one wall and the porous heat transfer element residing therein, overlie the electronic component.

8. The tamper-respondent assembly of claim 1, further comprising a monitor circuit positioned with the secure volume to monitor the pressure sensor to identify the pressure change indicative of the tamper event.

9. The tamper-respondent assembly of claim 8, wherein the pressure sensor is a first pressure sensor, and wherein the tamper-respondent assembly further comprises a second pressure sensor to sense pressure within the secure volume to facilitate identifying the pressure change indicative of the tamper event, the monitor circuit further monitoring the second pressure sensor.

10. The tamper-respondent assembly of claim 8, further comprising at least one tamper-detect circuit embedded within circuit board, the at least one tamper-detect circuit comprising one or more circuit lines in a tamper-detect pattern, wherein the monitor circuit further monitors the at least one tamper-detect circuit for a tamper event through, at least in part, the circuit board.

11. A tamper-respondent assembly comprising:
- a circuit board comprising a first side and a second side, the first side and the second side being opposite sides of the circuit board;
- multiple electronic components, including at least one first electronic component coupled to the first side of the circuit board, and at least one second electronic component coupled to the second side of the circuit board;
- a first enclosure assembly mounted to the first side of the circuit board to enclose the at least one first electronic component coupled to the first side of the circuit board within a first chamber of a secure volume, the first enclosure assembly comprising:
  - a thermally conductive enclosure with a sealed inner compartment within the thermally conductive enclosure, the thermally conductive enclosure being mounted to the first side of the circuit board;
  - a porous heat transfer element within the sealed inner compartment of the thermally conductive enclosure, the porous heat transfer element being sized and located to facilitate conducting heat from the at least one first electronic component across the sealed inner compartment of the thermally conductive enclosure;
  - wherein the porous heat transfer element is selectively positioned within the sealed inner compartment of the thermally conductive enclosure to overlie the at least one first electronic component to facilitate conducting heat from the at least one first electronic component across the sealed inner compartment, and thereby through the thermally conductive enclosure; and
- a second enclosure assembly mounted to the second side of the circuit board to enclose the at least one second electronic component coupled to the second side of the circuit board within a second chamber of the secure volume; and
- a pressure sensor to sense pressure within the sealed inner compartment of the thermally conductive enclosure to facilitate identifying a pressure change indicative of a tamper event.

12. The tamper-respondent assembly of claim 11, wherein the porous heat transfer element comprises a porous material, and is sized and located relative to the at least one first electronic component to facilitate conducting heat from the at least one first electronic component across the sealed inner compartment of the thermally conductive enclosure, and wherein the porous material has a porosity in a range of 30%-80%.

13. The tamper-respondent assembly of claim 11, wherein the porous heat transfer element comprises a porous material, and is sized and located relative to the at least one first electronic component to facilitate conducting heat from the at least one first electronic component across the sealed inner compartment of the thermally conductive enclosure, and wherein the porous material comprises a sintered metal structure.

14. The tamper-respondent assembly of claim 11, wherein the thermally conductive enclosure comprises an inner wall and an outer wall, the inner sealed compartment being located between the inner wall and the outer wall of the thermally conductive enclosure, and wherein the porous heat transfer element is bonded to the inner wall and to the outer wall within the sealed inner compartment of the thermally conductive enclosure.

15. The tamper-respondent assembly of claim 14, wherein the porous heat transfer element comprises a porous material between a lower metal foil and an upper metal foil, and wherein the porous heat transfer element is soldered or brazed to the inner wall and the other outer wall of the thermally conductive enclosure, the lower metal foil and the upper metal foil preventing solder or braze material from penetrating into the porous material.

16. A method of fabricating a tamper-respondent assembly, the method comprising:
   providing a circuit board, the circuit board including an electronic component;
   mounting an enclosure assembly to the circuit board to enclose the electronic component within a secure volume, the enclosure assembly comprising:
      a thermally conductive enclosure with a sealed inner compartment within the thermally conductive enclosure, the thermally conductive enclosure being mounted to the circuit board;
      a porous heat transfer element within the sealed inner compartment of the thermally conductive enclosure, the porous heat transfer element being sized and located to facilitate conducting heat from the electronic component across the sealed inner compartment of the thermally conductive enclosure; and
   wherein the porous heat transfer element is selectively positioned within the sealed inner compartment of the thermally conductive enclosure to overlie the electronic component to facilitate conducting heat from the electronic component across the sealed inner compartment, and thereby through the thermally conductive enclosure; and
   providing a pressure sensor to sense pressure within the sealed inner compartment of the thermally conductive enclosure to facilitate identifying a pressure change indicative of a tamper event.

17. The method of claim 16, wherein the porous heat transfer element comprises a porous material, and is sized and located relative to the electronic component to facilitate conducting heat from the electronic component across the sealed inner compartment of the thermally conductive enclosure, and wherein the porous material has a porosity in a range of 30%-80%.

18. The method of claim 16, wherein the porous heat transfer element comprises a porous material, and is sized and located relative to the electronic component to facilitate conducting heat from the electronic component across the sealed inner compartment of the thermally conductive enclosure, and wherein the porous material comprises a sintered metal structure.

* * * * *